Nov. 8, 1932.   C. H. BECKWITH   1,886,518
AIR MOTOR VALVE
Filed Feb. 16, 1931   7 Sheets-Sheet 2

Fig. 2.

Inventor
Clinton H. Beckwith

Witness
R. B. Davison

By Wilson, Dowell, McCanna & Rehm
Attys.

Nov. 8, 1932.     C. H. BECKWITH     1,886,518
AIR MOTOR VALVE
Filed Feb. 16, 1931     7 Sheets-Sheet 4

Inventor
Clinton H. Beckwith
By Wilson, Bowell, McKenna & Palmer
Att'ys

Nov. 8, 1932.  C. H. BECKWITH  1,886,518
AIR MOTOR VALVE
Filed Feb. 16, 1931  7 Sheets-Sheet 5

Inventor
Clinton H. Beckwith
By Wilson, Dowell, McCanna & Rehm
Att'ys

Nov. 8, 1932.   C. H. BECKWITH   1,886,518
AIR MOTOR VALVE
Filed Feb. 16, 1931   7 Sheets-Sheet 6

Fig. 8.

Witness
R B Davison

Inventor
Clinton H. Beckwith
By Wilson, Dowell, McCanna & Rehm
Attys.

Nov. 8, 1932.　　　C. H. BECKWITH　　　1,886,518
AIR MOTOR VALVE
Filed Feb. 16, 1931　　　7 Sheets-Sheet 7

Fig.9

Inventor
Clinton H. Beckwith
By Wilson, Dowell, McCanna & Rehm
Attys.

Witness
A. B. Davison

Patented Nov. 8, 1932

1,886,518

UNITED STATES PATENT OFFICE

CLINTON H. BECKWITH, OF GENEVA, ILLINOIS, ASSIGNOR TO CRANE CO., OF CHICAGO, ILLINOIS, A CORPORATION OF ILLINOIS

AIR MOTOR VALVE

Application filed February 16, 1931. Serial No. 516,094.

This invention relates to power operated valves and has for its purpose the provision of a fully automatic power operated valve whereby the valve closure member may be positively operated and controlled in both opening and closing directions by a fluid operated motor.

It is an object of this invention to provide a fluid actuated valve operating means which is automatically rendered inoperative whenever excessive resistance is offered to further movement of the valve closure member.

It is also an object of this invention to provide a fluid actuated valve operating means which is automatically rendered inoperative whenever excessive resistance is offered to further movement of the valve closure member in closing direction and also when the valve closure member reaches a predetermined position in its opening movement.

It is a further object of this invention to provide a fully automatic power operated valve that is particularly well suited for operation under severe service conditions involving varying high pressures and temperatures for the transportation of volatile and combustible fluids.

It is a still further object of this invention to provide auxiliary control valves which will permit the control of the source of fluid energy to accomplish the foregoing feature.

In accordance with this invention a fluid operated motor such as an air motor is utilized as the operating or driving medium and is controlled by auxiliary valve mechanism actuated in accordance with the torque required to turn the valve stem. In the preferred form the air motor is controlled in part by auxiliary valve mechanism actuated in accordance with the torque required to turn the valve stem in closing direction and in part by valve mechanism actuated in accordance with the position of the valve closure member in opening direction. It is also preferred to utilize a main control valve in combination with auxiliary valve mechanism normally biased in open position and arranged to be tripped into closed position at predetermined times and positions.

Further objects, advantages and novel features of construction will appear from the following description given in connection with the drawings, in which.

Referring to the drawings more in detail, it will be seen that the invention is illustrated as being applied to a gate valve including a casing or body 1 having a passage therethrough and to which is secured a bonnet 2 which supports a yoke or standard 3. A closure member comprising a pair of gates 4 serves to close the passage through the valve. The gates are arranged to be actuated and controlled by a motor 5 through suitable transmission mechanism. The gates 4 are carried upon the lower end of a stem 6 which passes up through the bonnet and the yoke. The upper end of the stem is threaded and engages a similarly internally threaded rotatable sleeve nut 7 which is rotatably connected to the hub 8 of a gear 9 to be driven thereby. A nut 11 engages the upper end of sleeve nut 7 and retains gear 9 in place. To the hub 8 of gear 9 is also secured a handwheel 12 for manual operation of the valve. Gear 9, and accordingly valve stem 6, is arranged to be power driven by the air motor 5 through suitable gearing and controlling devices later to be described and terminating in a gear 14 which engages gear 9. Air motor 5 may be of any suitable construction that is capable of being selectively driven in either direction.

The gearing and control mechanism through which motor 5 drives gear 14 includes a limit valve for controlling the opening movements of the valve after predetermined movement in opening direction and a torque valve for controlling the closing movements of the valve when a predetermined torquing effort has been applied to the valve stem.

The torque control mechanism whereby the closing movements of the valve are controlled will first be described. The motor 5 is secured to a casing or housing 16 which supports and incloses suitable gearing mechanism and which in turn is bolted or suitably secured to a flange 17 projecting from the yoke and which thereby supports the entire motor and associated mechanisms in proper operative relation to gear 9.

The shaft 18 of the motor is directly connected to a worm shaft 19 through a coupling sleeve 21, one end of which is keyed to shaft 18 and the other end of which is splined to slidingly but non-rotatably receive one end of worm shaft 19. Sleeve 21 is provided with an external projecting flange 22 which is engaged between a pair of thrust bearings 23 secured within the casing 16. Sleeve 21 may therefore freely rotate but may not be moved axially. On the other hand, worm shaft 19 and worm 24 carried thereby may move axially. For this purpose the opposite end of the shaft is reduced in diameter as at 26 to provide a shoulder 27 which abuts against a bearing 28 mounted within a sleeve composed of two connected cup-like members 29 and 30, the former being supported within the housing 16. Surrounding the reduced portion 26 of the worm shaft is a spring 31 maintained under compression within the sleeve by a cup 32 and nut 33 secured to the end of the reduced portion 26 of shaft 19. Spring 31 therefore normally urges shaft 19 away from motor 5. Shaft 19 is movable longitudinally against the action of this spring whenever worm wheel 34 which engages worm 24 is held against rotation or meets sufficient resistance to turning movements whereupon worm 24 will work through the teeth of the worm wheel against the compression of spring 31.

The drive from worm wheel 34 to gear 14 is through a suitable clutching mechanism whereby the motor and its associated train of gears may be disconnected when it is desired to operate the valve manually. For this reason worm wheel 34 is rotatably mounted upon its shaft 36 and is provided with a set of clutch elements 37 upon one face thereof. Elements 37 are adapted to engage a complementary pair of clutch elements 38 projecting from a clutch collar 39 which non-rotatably engages a splined portion 41 of shaft 36. A yoke 42 pivoted at 43 to the gear casing engages collar 39 and is in turn engaged by a pair of dogs 44 projecting from a throwout sleeve 46 keyed to a throwout shaft 47 upon one end of which is secured a clutch lever 48. It follows from the above that worm wheel 34 may be disengaged from shaft 36 which also carries gear 14 whereby the motor and its associated train of gears may be disconnected from gear 14 to permit manual operation of the valve.

Figures 4, 5:
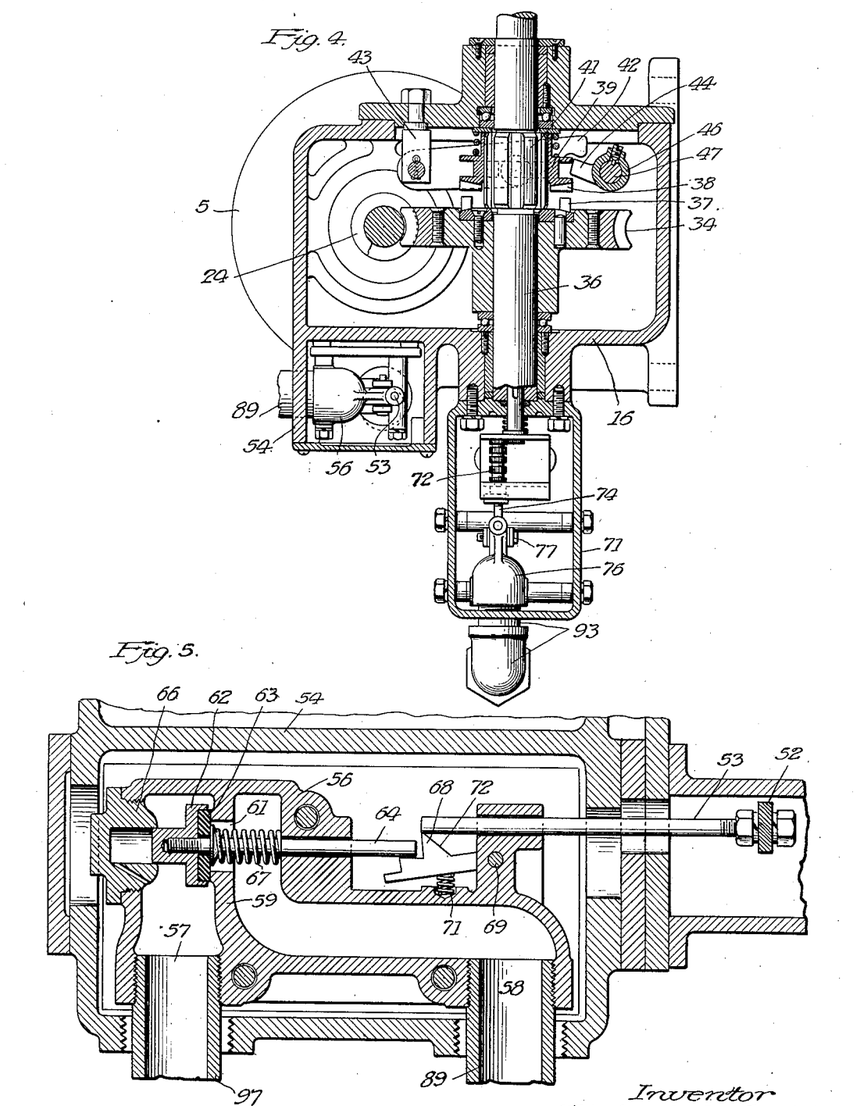
Fig. 4 is a vertical transverse section on line 4—4 of Fig. 3.
Fig. 5 is an enlarged section on line 5—5 of Fig. 3.
Figure 6:
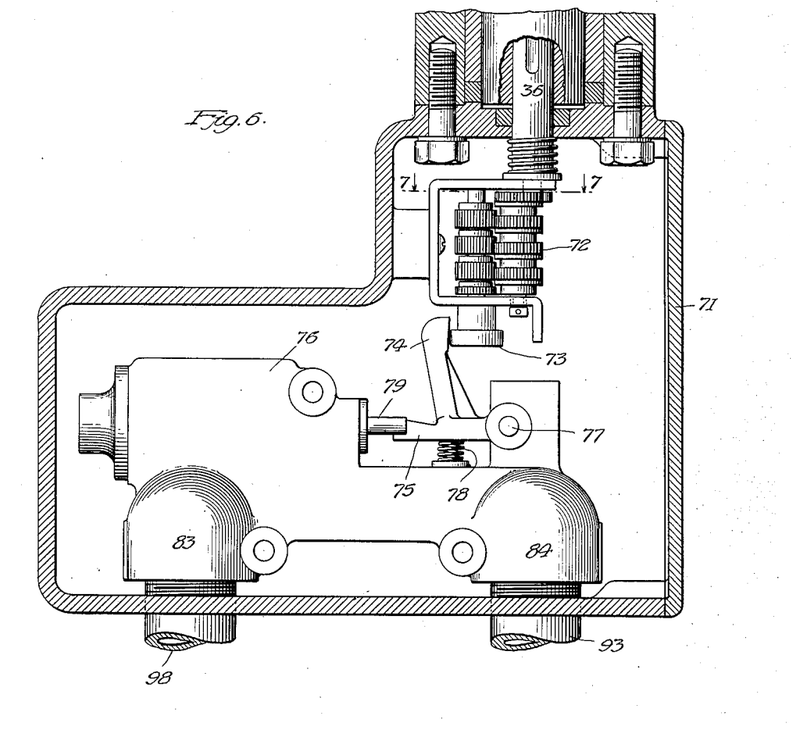
Fig. 6 is an enlarged fragmentary section of the opening limit valve mechanism illustrated in Fig. 3.
Figure 7:
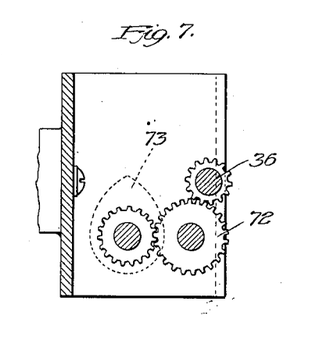
Fig. 7 is a section on line 7—7 of Fig. 6.

Secured to the outer end of shaft 19 are a pair of rods 49 which extend through the end wall of the sleeve member 30 and are inclosed by a cap 51. Adjustably secured to the outer ends of rods 49 is a lever 52 which extends downwardly and inwardly and is adjustably connected to the end of a trip rod 53 (Fig. 5) which actuates a latching mechanism for controlling an auxiliary control valve.

This auxiliary control valve is inserted in one of the inlets to the air motor and is housed within an outer casing 54 which is a part of the main housing. Within this housing is the valve body 56 provided with an inlet 57 and an outlet 58 separated by a partition wall 59 having a port 61 therethrough. The port is arranged to be closed by a valve closure member having a head 62 provided with a seating disc 63 and a stem 64. The head is reciprocable within a bore formed in a removable head 66 of the body, the bore being relieved by a bleed into the inlet 57. The valve stem is guided within the body and has its outer end projecting therethrough. The valve is normally biased to open position by a compression spring 67 disposed around the stem and between the inner side of the seat and the body although the surface of the valve head is subject to the pressure of the incoming fluid. The valve is arranged to be held open by a latching mechanism comprising a stepped dog 68 pivoted at 69 to a projection formed upon the body and normally urged into engaging position with the end of the valve stem by a spring 71. The dog is provided with an inclined surface 72 positioned to be engaged by the trip rod 53 to depress dog 68 out of the path of the valve stem to permit the valve to be closed by the pressure of the incoming fluid through inlet 57 upon the head 62 and which will act against the force of spring 67 to close the valve whenever fluid under pressure is admitted into inlet 57 and the dog 68 is depressed by trip rod 53 the latter being actuated by a lever 52.

Figure 1:
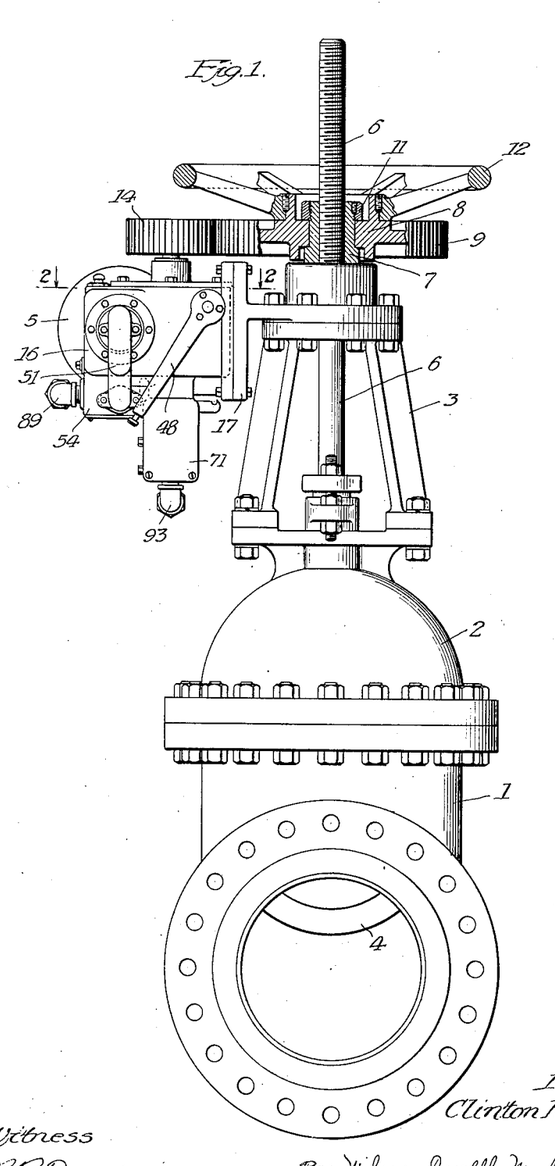
Fig. 1 is an end elevation of a gate valve embodying the motor operating and control means of this invention.
Figure 2:
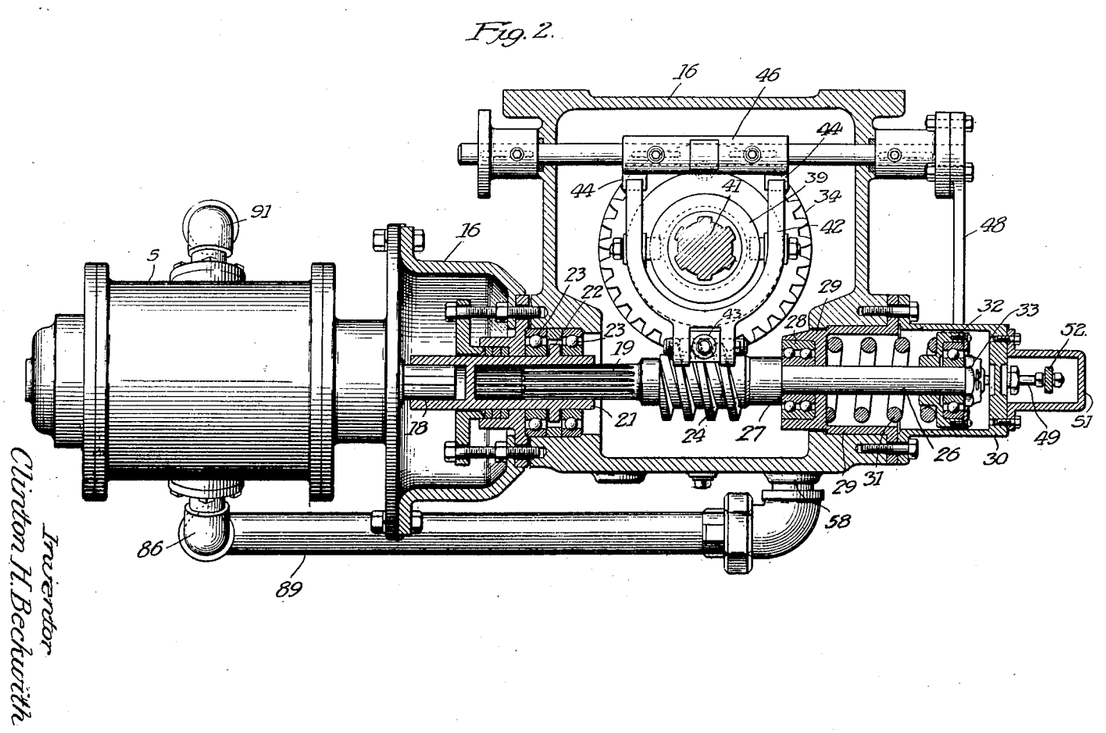
Fig. 2 is a section on line 2—2 of Fig. 1.
Figure 3:
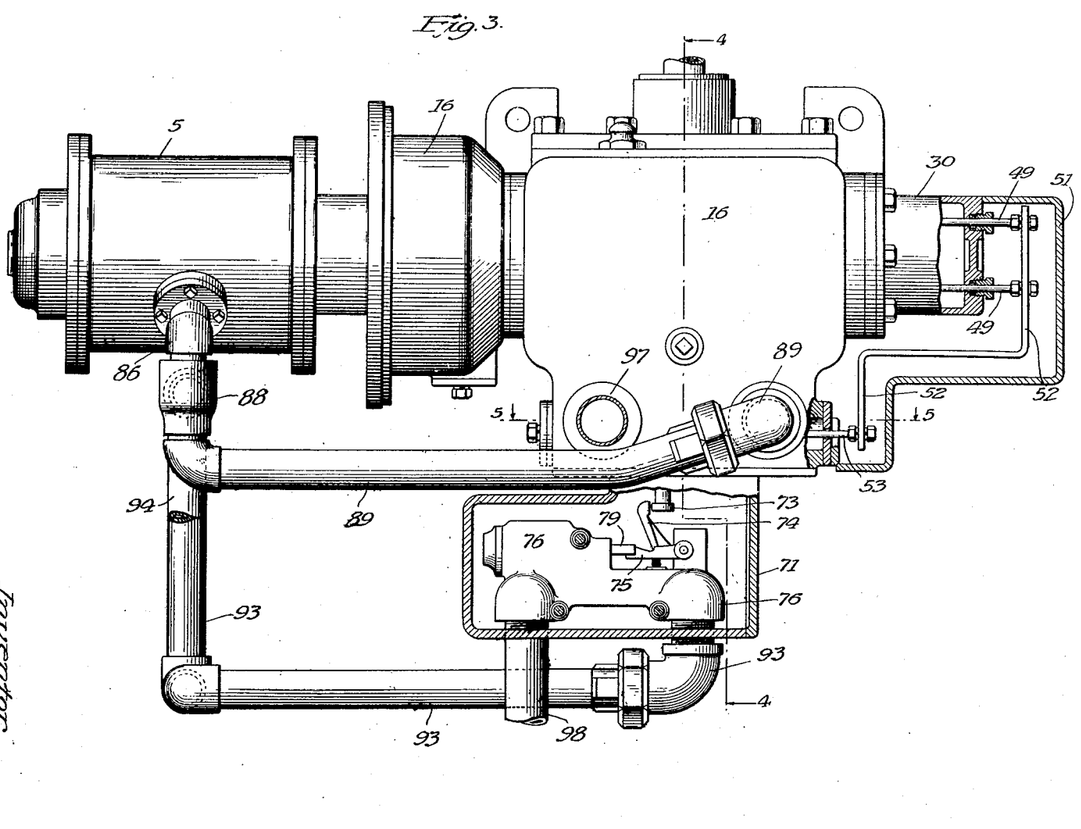
Fig. 3 is a side elevation partly in section of the driving motor and control mechanism therefor.

From the foregoing description of the torque control mechanism it will be apparent that whenever the closure member meets sufficient resistance to its closing movements worm 24 will screw through worm wheel 34 and move shaft 19 axially, thereby moving lever 52 inward toward the motor as viewed in Fig. 2 moving rod 53 inwardly to depress or trip the latch dog 68. This will permit the incoming fluid to close the valve 62 against the action of spring 67. When the incoming fluid has been cut off by the main control valve, later to be described, spring 67 will return the valve to its open position which will permit dog 68 to return to its locking position after withdrawal of trip rod 53. The foregoing mechanism controls the closing movements of the valve.

The limit switch control mechanism for controlling the valve in its opening movements will now be described. The opening movements of the valve are determined by the position of the closure member and not by resistance to its opening movement. The limit control mechanism is housed within a casing 71 secured to the lower end of main casing 16 directly below shaft 36. The limit control mechanism is operated from the lower end of shaft 36 and comprises a train of skip tooth gearing indicated generally by 72 through which is driven a trip cam 73 which engages an arm 74 projecting outwardly from the latching dog 75. The skip tooth gearing is of course interchangeable in the usual manner to permit adjustment of rotation of cam 73 relatively to rotation of the valve stem. Dog 75 is pivoted to a second auxiliary valve body 76 as at 77 and is urged into latching position by a spring 78. The latch 75 engages the projecting stem 79 of the valve in a similar manner to that set forth in connection with the previously described auxiliary control valve 56 having stem 64 projecting therefrom. The valve body 76 is provided with a closure member 81 which controls the flow through port 82 and is disposed between the inlet 83 and outlet 84.

It follows from the above description of the limit control mechanism that after a predetermined number of turns of shaft 36 which is representative of a certain position of the valve stem 6 and closure members 4, cam 73 will rotate latch dog 75 to permit closing of the valve member 81. Here as in the previously described valve, the valve will be normally returned to open position after fluid supply has been cut off to the inlet 83.

Having described the torque control and limit control mechanism and their operative connections to the valve stem and gate as well as to the driving motor, the piping and connections of the auxiliary valves to the driving motor and to the main control valve will be described.

The motor, as has been previously stated, is of the reversible type and is provided with two inlets 86 and 87 (Fig. 8) adapted to receive fluid supply for driving the motor in opposite directions. Inlet 86 is connected to the discharge side 58 of the auxiliary torque control valve 56 through a check valve 88, arranged to normally permit flow into the inlet 86, and pipe 89. Inlet 87 is connected to the discharge side 84 of the limit control auxiliary valve 76 through a check valve 91, arranged to normally permit flow into inlet 87, and pipe 93. Each of the check valves 88 and 91 have a side outlet controlled by the check and communicating with a common motor exhaust 94. The swing closure members of the check valve are mechanically tied together by a rod 96 in such a manner that when check valve 88 is opened to permit flow into the motor and closed to prevent flow through its side outlet the swing closure member of check valve 91 is positively closed to prevent flow from the inlet back to the control valve but to permit flow from inlet 87 into the common discharge or exhaust 94. When the swing closure member of check valve 91 is opened to permit flow into inlet 87 from valve 76, check valve 88 is in its closed position, that is, closed to flow into motor 5 from pipe 89.

The two inlets 57 and 83 of the two auxiliary control valves are connected to opposite sides of a four way main control cock 96 through piping 97 and 98 respectively. The cock has a common exhaust 99 and a common inlet 101. The operation of cock 96 is to direct the source of fluid supply into either valve 56 while exhausting through valve 76 or into valve 76 while exhausting through valve 56. The direction of rotation of motor 5 can thereby be controlled by operation of cock 96 to cause the motor to rotate in either direction as desired.

Figure 8:
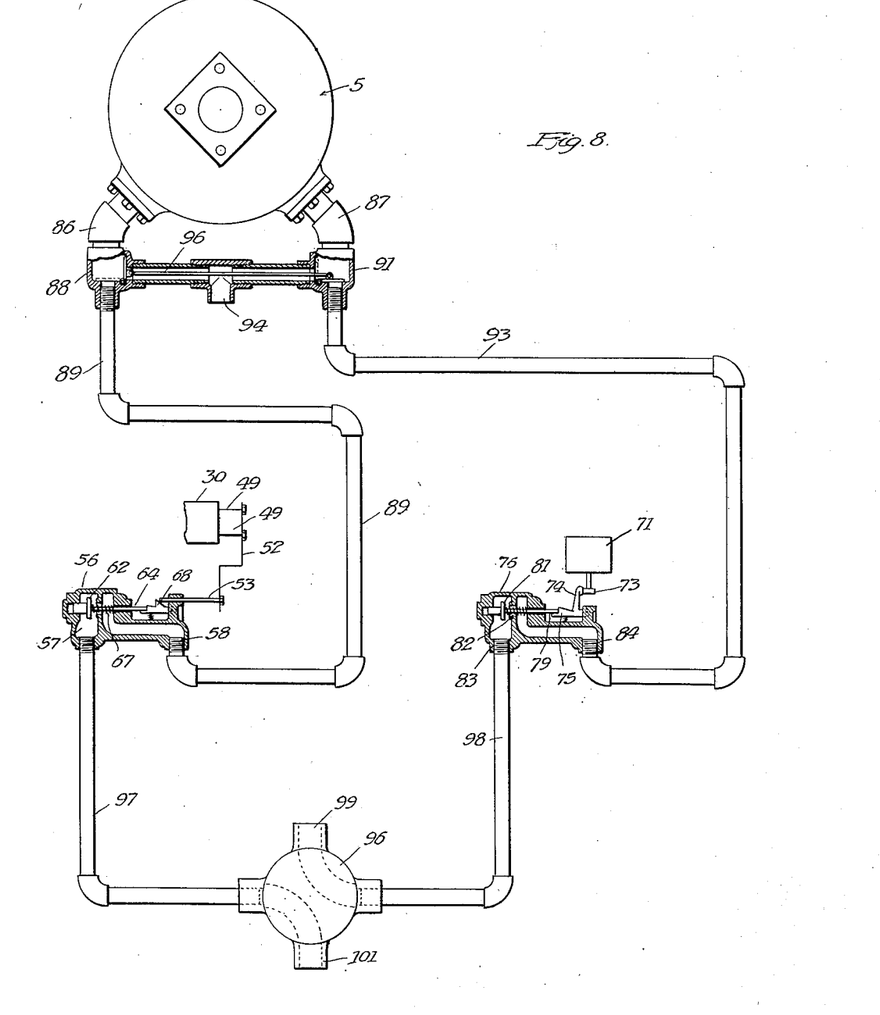
Fig. 8 is a diagrammatic layout of the connections to the operating motor.

In operation, assuming the auxiliary control valves to be open by a prior operation and assuming that it is desired to close the valve gates 4, the operator will move the main control cock 96 to the position indicated in Fig. 8 to direct the operating fluid into pipe 97 and valve body 56. Valve head 62 being normally open through the action of spring 67 and latched in this position, the fluid under pressure will flow through the valve through pipe 89 and into inlet 86 opening check valve 88 and closing check valve 91. Prior to check valve 91 seating tightly in its closed position as shown in Fig. 8, a surge of fluid will pass through check valve 91, pipe 93 and inlet 84 of valve 76. The passage or sudden surge or shot of fluid through the valve in this direction will tend to open the valve 81 should it be stuck inasmuch as the valve 98 is exhausted through the common exhaust 99.

The motor being driven in closing direction, the valve gates 4 will be closed through the transmission mechanism previously described until cock 96 is closed or until the gates 4 meet some obstruction such as the bottom of the body 1 when fully closed. Upon encountering this resistance worm 24 will screw through worm wheel 34 moving shaft 19 to trip latch 68. This will permit the fluid in pipe 97 to close valve head 62 which will shut off the fluid supply to inlet 86. Valve head 62 will remain closed until the position of cock 96 is changed to exhaust pipe 97 and inlet 57 of valve 56.

The opening movements are accomplished by rotating cock 96 to connect inlet 101 with pipe 98. The flow of fluid will then be through pipe 98, valve 76, pipe 93, check valve 91 and inlet 87 to cause the motor 5 to be rotated in the reverse direction. The motor will be rotated in this direction until cock 96 is moved or until cam 73 rotates latch 75 to permit the fluid in pipe 98 to close valve 81.

Should it be desired to operate valve gates 4 manually at any time clutch lever 48 may be operated to disconnect motor 5 and its associated transmission mechanism after which valve gates 4 and stem 6 may be operated through handwheel 12.

Figure 9:
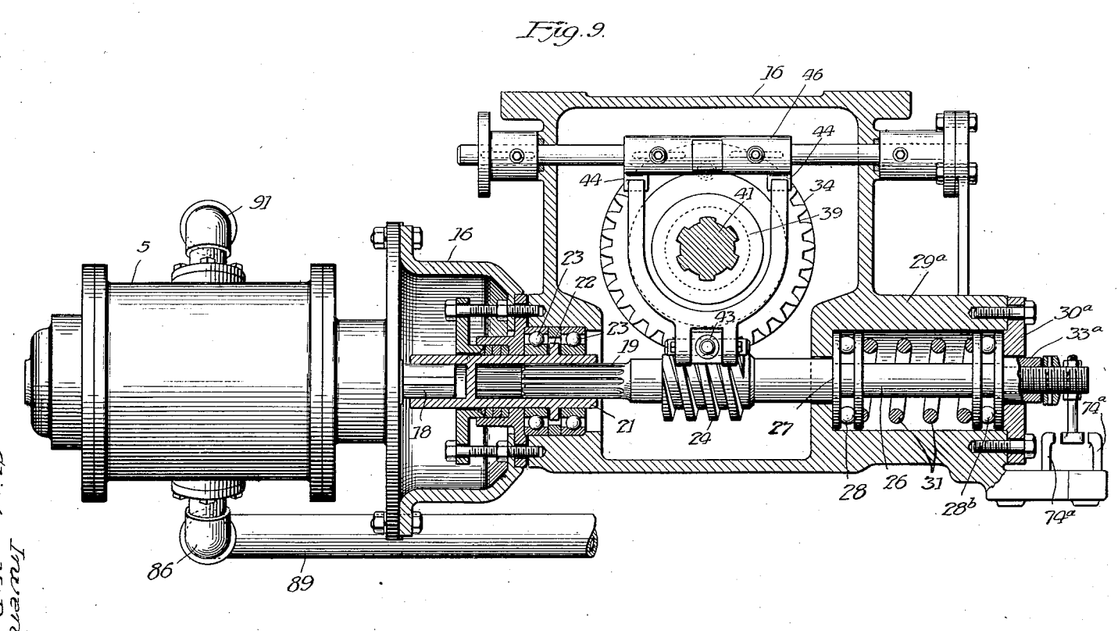
Fig. 9 is a section similar to Fig. 2 illustrating a slightly modified form of this invention in which the resistance to torque controls both opening and closing movements.

In the modified form of this invention illustrated in Fig. 9 the valve actuating mechanism is controlled in both opening and closing directions by torque control mechanism whereby resistance to rotation of the valve stem in either direction will automatically stop the actuating motor.

The mechanism involved is substantially like that described in connection with the torque control mechanism of the heretofore described form of this invention with a few changes. Shaft 19 instead of being supported for axial movement in one direction only, is supported for axial movement in either direction. For this purpose the outer portion is carried in a cylindrical boss 29a formed integrally with the housing 16 and bored to receive bearings 28a, and 28b with spring 31 therebetween. A cap 30a, secured to the open end of the boss, retains the spring and bearing within the boss while permitting axial movement of the shaft in either direction against the resistance of spring 31. A nut 33a in conjunction with a sleeve 35, permits of adjustment of the tension of spring 31.

To the outer end of the shaft is secured an arm 52a which extends between a pair of latch arms 74a of a pair of auxiliary control valves similar to those previously described. The action of the valves in this system is the same as that previously described and therefore the description will not be repeated except to say that one valve controls the rotation of the motor in each direction.

It is believed to be apparent from the foregoing description that there has been provided a motor operated valve actuated by a fluid operated motor in either direction and automatically controlled in either direction. The two auxiliary control valves are fully automatic and self-resetting and require no attention whatever. It is only necessary for the operator to actuate the main control cock. The valve operating mechanism may be adjusted to a nicety to control the closing and opening movements to any predetermined point. The valve gates may also be stopped at any point in their opening or closing movements manually by operation of the main control cock. The installation described is particularly advantageous where severe service conditions are encountered such as high temperature, high pressures and the presence of volatile oils or combustible gases.

It is obvious that many changes may be made in the details of construction without departing from the spirit and scope of this invention as defined by the appended claims.

I claim:

1. In a power operated valve, a valve body having a passage therethrough, a valve closure member within said body for closing said passage, a reversible fluid operated motor, transmission means operatively connecting said motor to said closure member, valve means for controlling the fluid supply for driving the motor in two directions, means responsive to the opening movement of said closure member for operating said control means at a predetermined time to control operation of said motor in one direction and means responsive to resistance to movement of said closure member in closing movements for operating said control means at a predetermined time to control operation of said motor in the other direction.

2. In a power operated valve, a valve body having a passage therethrough, a valve closure member within said body for closing said passage, a reversible fluid operated motor, transmission means operatively connecting said motor to said closure member, a valve for controlling the operation of said motor in one direction, a second valve for controlling operation of said motor in the opposite direction, means responsive to opening movements of said closure member for closing one of said valves at a predetermined time and means responsive to resistance to movement of said closure member in closing direction for closing the other of said valves at a predetermined time.

3. In a power operated valve, a valve body having a passage therethrough, a valve closure member within said body for closing said passage, a reversible fluid operated motor, transmission means operatively connecting said motor to said closure member, a valve for controlling the operation of said motor in one direction, a second valve for controlling the operation of said motor in the opposite direction, latching mechanisms for holding said valves open, means responsive to the opening movement of said closure member for tripping one of said latch mechanisms to permit closing of one of said valves at a predetermined time and means responsive to resistance to movement of said closure member in closing direction for tripping the other of said latch mechanisms to permit closing of the other of said valves at a predetermined time.

4. In a power operated valve, a valve body having a passage therethrough, a valve closure member within said body for closing said passage, a reversible fluid operated motor, transmission means operatively connecting said motor to said closure member, a valve arranged to be closed by the fluid supply for controlling the operation of said motor in one direction, a second valve arranged to be closed by the fluid supply for controlling the operation of said motor in the opposite direction, latching mechanisms for holding said valves open, means responsive to the opening movement of said closure member for tripping one of said latch mechanisms to permit closing of one of said valves at a predetermined time and means responsive to resistance to movement of said closure member in closing direction for tripping the other of said latch mechanisms to permit closing of the other of said valves at a predetermined time.

5. In a power operated valve, a valve body having a passage therethrough, a valve closure member within said body for closing said passage, a reversible fluid operated motor, transmission means operatively connecting said motor to said closure member, a valve normally open and arranged to be closed by the fluid supply for controlling the operation of said motor in one direction, a second valve normally open and arranged to be closed by the fluid supply for controlling the operation of said motor in the opposite direction, latching mechanisms for holding said valves open, means responsive to the opening movement of said closure member for tripping one of said latch mechanisms to permit closing of one of said valves at a predetermined time and means responsive to resistance to movement of said closure member in closing direction for tripping the other of said latch mechanisms to permit closing of the other of said valves at a predetermined time.

6. In a power operated valve, a valve body having a passage therethrough, a valve closure member within said body for closing said passage, a reversible fluid operated motor, transmission means operatively connecting said motor to said closure member, a valve for controlling the operation of said motor in one direction, a second valve for controlling operation of said motor in the opposite direction, latching mechanisms for holding said valves open, means responsive to the opening movement of said closure member for tripping one of said latching mechanisms to permit closing of one of said valves at a predetermined time, means responsive to resistance to movements of said closure member in closing direction for tripping the other of said latch mechanisms to permit closing the other of said valves at a predetermined time and means for resetting said valves in latched open position.

7. In a power operated valve, a valve body having a passage therethrough, a valve closure member within said body for closing said passage, a reversible fluid operated motor, transmission means operatively connecting said motor to said closure member, a valve arranged to be closed by the fluid supply for controlling the operation of said motor in one direction, a second valve for controlling operation of said motor in the opposite direction, latching mechanisms for holding said valves open, means responsive to the opening movement of said closure member for tripping one of said latching mechanisms to permit closing of one of said valves at a predetermined time, means responsive to resistance to movements of said closure member in closing direction for tripping the other of said latch mechanisms to permit closing the other of said valves at a predetermined time and means for resetting said valves in latched open position.

8. In a power operated valve, a valve body having a passage therethrough, a valve closure member within said body for closing said passage, a reversible fluid operated motor, transmission means operatively connecting said motor to said closure member, a control valve for directing fluid to said motor to selectively operate said motor in either direction, auxiliary valve means for controlling the fluid supply for driving the motor in either direction, means responsive to the opening movement of said closure member for closing said auxiliary valve means at a predetermined time to prevent rotation of said motor in one direction and means responsive to resistance to movements of said closure member in closing direction for closing said auxiliary valve means at a predetermined time to prevent rotation of said motor in the other direction.

9. In a power operated valve, a valve body having a passage therethrough, a valve closure member within said body for closing said passage, a reversible fluid operated motor, transmission means operatively connecting said motor to said closure member, a control valve for directing fluid to said motor to selectively operate said motor in either direction, an auxiliary valve for controlling the operation of said motor in one direction, a second auxiliary valve for controlling operation of said motor in the opposite direction, means responsive to the opening movement of said closure member for closing one of said auxiliary valves at a predetermined time and means responsive to resistance to closing movements of said closure member for closing the other of said auxiliary valves at a predetermined time.

10. In a power operated valve, a valve body having a passage therethrough, a valve closure member within said body for closing said passage, a reversible fluid operated motor, transmission means operatively connecting said motor to said closure member, a control valve for directing fluid to said motor to selectively operate said motor in either direction, an auxiliary valve arranged to be closed by the fluid from said control valve for controlling the operation of said motor in one direction, a second auxiliary valve arranged to be closed by the fluid from said control valve for controlling operation of said motor in the opposite direction, means responsive to the opening movement of said closure member for closing one of said auxiliary valves at a predetermined time and means responsive to resistance to closing movements of said closure member for closing the other of said auxiliary valves at a predetermined time.

11. In a power operated valve, a valve body having a passage therethrough, a valve closure member within said body for closing said passage, a reversible fluid operated motor, transmission means operatively connecting said motor to said closure member, a control valve for directing fluid to said motor to selectively operate said motor in either direction, an auxiliary valve for controlling the operation of said motor in one direction, a second auxiliary valve for controlling operation of said motor in the opposite direction, means responsive to the opening movement of said closure member for closing one of said auxiliary valves at a predetermined time, means responsive to resistance to closing movements of said closure member for closing the other of said auxiliary valves at a predetermined time and means for reopening said auxiliary valves.

12. In a power operated valve, a valve body having a passage therethrough, a valve closure member within said body for closing said passage, a reversible fluid operated motor, transmission means operatively connecting said motor to said closure member, a control valve for directing fluid to said motor to selectively operate said motor in either direction, an auxiliary valve arranged to be closed by the fluid from said control valve for controlling the operation of said motor in one direction, a second auxiliary valve arranged to be closed by the fluid from said control valve for controlling the operation of said motor in the opposite direction, means responsive to the opening movement of said closure member for closing one of said auxiliary valves at a predetermined time, means responsive to resistance to closing movements of said closure member for closing the other of said auxiliary valves at a predetermined time and means for reopening said auxiliary valves.

13. In a power operated valve, a valve body having a passage therethrough, a valve closure member within said body for closing said passage, a reversible fluid operated motor having a pair of fluid inlets, a check valve in each of said inlets each arranged to permit flow into said motor, an exhaust leading from said check valves in said inlets, a control valve connected to each of said inlets, means responsive to the opening movements of said closure member for controlling one of said control valves and means responsive to resistance to closing movement of said closure member for controlling the other of said control valves.

14. In a power operated valve, a valve body having a passage therethrough, a valve closure member within said body for closing said passage, a reversible fluid operated motor having a pair of fluid inlets, a check valve in each of said inlets each arranged to permit flow into said motor, a common exhaust leading from said check valves in said inlets, a control valve connected to each of said inlets, means responsive to the opening movements of said closure member for controlling one of said control valves and means responsive to resistance to closing movement of said closure member for controlling the other of said control valves.

15. In a power operated valve, a valve body having a passage therethrough, a valve closure member within said body for closing said passage, a reversible fluid operated motor having a pair of fluid inlets, a check valve in each of said inlets each arranged to permit flow into said motor, said check valves being mechanically connected together, an exhaust leading from said check valves in said inlets, a control valve connected to each of said inlets, means responsive to the opening movements of said closure member for controlling one of said control valves and means responsive to resistance to closing movement of said closure member for controlling the other of said control valves.

16. In a power operated valve, a valve body having a passage therethrough, a valve closure member within said body for closing said passage, a reversible fluid operated motor having a pair of connected fluid inlets, a check valve in each of said inlets each arranged to permit flow into said motor, an exhaust leading from said check valves in said inlets, a control valve connected to each of said inlets, means responsive to the opening movements of said closure member for controlling one of said control valves and means responsive to resistance to closing movement of said closure member for controlling the other of said control valves.

17. In a power operated valve, a valve body having a passage therethrough, a valve closure member within said body for closing said passage, a reversible fluid operated motor having a pair of fluid inlets, control valves in each of said inlets, means responsive to the opening movements of said closure member for controlling one of said inlet valves, means responsive to resistance to closing movements of said closure member for controlling the other of said inlet valves, a main control cock connected to said control valves and a source of fluid under pressure connected to said main cock.

18. In a power operated valve, a valve body having a passage therethrough, a valve closure member within said body for closing said passage, a reversible fluid operated motor having a pair of fluid inlets, an auxiliary control valve in each of said inlets, means responsive to the opening movements of said closure member for controlling one of said auxiliary control valves, means responsive to resistance to closing movements of said closure member for controlling the other of said auxiliary control valves, a main control cock connected to said auxiliary control valves, the connections between said auxiliary control valves and said inlets to the motor being arranged to permit an initial exhaust flow through said auxiliary valves but to prevent continued exhaust through said valves.

19. In a power operated valve, a valve body having a passage therethrough, a valve closure member within said body for closing said passage, a reversible fluid operated motor, transmission means operatively connecting said motor to said closure member, a valve for controlling the operation of said motor in one direction, a second valve for controlling operation of said motor in the opposite direction, means responsive to resistance to opening movements of said closure member for closing one of said valves at a predetermined time and means responsive to resistance to movement of said closure member in closing direction for closing the other of said valves at a predetermined time.

20. In a power operated valve, a valve body having a passage therethrough, a valve closure member within said body for closing said passage, a reversible fluid operated motor, transmission means operatively connecting said motor to said closure member, a valve for controlling the operation of said motor in one direction, a second valve for controlling the operation of said motor in the opposite direction, latching mechanisms for holding said valves open, means responsive to resistance to the opening movement of said closure member for tripping one of said latch mechanisms to permit closing of one of said valves at a predetermined time and means responsive to resistance to movement of said closure member in closing direction for tripping the other of said latch mechanisms to permit closing of the other of said valves at a predetermined time.

21. A control valve comprising a valve body having inlet and outlet ports separated by a partition wall having a passage therethrough, a closure member for closing said passage and arranged to be closed by the incoming fluid, a latch for locking said member in one position and means independent of the fluid passing through said valve for releasing said latch.

22. A control valve comprising a valve body having inlet and outlet ports separated by a partition wall having a passage therethrough, a closure member for closing said passage and arranged to be closed by the incoming fluid, a latch for locking said member in open position, means for releasing said latch, and means for automatically opening said closure member upon a lowering of line pressure after release of said latch.

23. A control valve comprising a valve body having inlet and outlet ports separated by a partition wall having a passage therethrough, a closure member for closing said passage and arranged to be closed by the incoming fluid, means for biasing said member to open position, a latch pivoted upon a pivot immovably secured to said body for locking said member in one position and means for releasing said latch.

24. A control valve comprising a valve body having inlet and outlet ports separated by a partition wall having a passage therethrough, a closure member for closing said passage and arranged to be closed by the incoming fluid, means for biasing said member to open position, a latch disposed outside of the valve body for locking said member in open position and means for releasing said latch.

25. In a power operated valve, a valve body having a passage therethrough, a valve closure member within said body for closing said passage, a reversible fluid operated motor, transmission means operatively connecting said motor to said closure member, valves for controlling the fluid supply for driving the motor in either direction, latching mechanisms for holding said valves open, means responsive to the opening movement of said closure member for tripping one of said latching mechanisms to permit closing of one of said control valves at a predetermined time and means responsive to resistance to movement of said closure member in closing movements for tripping another of said latching mechanisms to permit closing of another of said control valves at a predetermined time.

26. In a power operated valve, a valve body having a passage therethrough, a valve closure member within said body for closing said passage, a reversible fluid operated motor, transmission means operatively connecting said motor to said closure member, valves arranged to be closed by the fluid supply for controlling the fluid supply for driving the motor in either direction, latching mechanisms for holding said valves open, means responsive to the opening movement of said closure member for tripping one of said latching mechanisms to permit closing of one of said control valves at a predetermined time and means responsive to resistance to movement of said closure member in closing movements for tripping another of said latching mechanisms to permit closing of said control valve at a predetermined time.

27. In a power operated valve, a valve body having a passage therethrough, a valve closure member within said body for closing said passage, a reversible fluid operated motor, transmission means operatively connecting said motor to said closure member, valve means for controlling the fluid supply through two passages for driving the motor in either direction, latching mechanisms for holding said valve means open, means responsive to the opening movement of said closure member for tripping one of said latching mechanisms to permit closing of said control valve means at a predetermined time to close one of said passages, means responsive to resistance to closing movement of said closure member for tripping another of said latching mechanisms to permit closing of said control valve at a predetermined time to close the other of said passages and means for resetting said valve in latched open position.

28. In a power operated valve, a valve body having a passage therethrough, a valve closure member within said body for closing said passage, a reversible fluid operated motor, transmission means operatively connecting said motor to said closure member, valve means arranged to be closed by the fluid supply for controlling the fluid supply through two passages for driving the motor in either direction, latching mechanisms for holding said valve means open, means responsive to the opening movement of said closure member for tripping one of said latching mechanisms to permit closing of said control valve at a predetermined time to close one of said passages, means responsive to resistance to closing movements of said closure member for tripping another of said latching mechanisms to permit closing of said control valve at a predetermined time to close the other of said passages, and means for resetting said valve in latched open position.

In witness of the foregoing I affix my signature.

CLINTON H. BECKWITH.